United States Patent
Yoshihiro (10) Patent No.: US 12,078,516 B2
(45) Date of Patent: Sep. 3, 2024

(54) AUTOMATIC CORRECTION METHOD

(71) Applicant: DMG MORI CO., LTD., Yamatokoriyama (JP)

(72) Inventor: Mitsugu Yoshihiro, Isehara (JP)

(73) Assignee: DMG MORI CO., LTD., Yamatokoriyama (JP)

(*) Notice: Subject to any disclaimer, the term of this patent is extended or adjusted under 35 U.S.C. 154(b) by 281 days.

(21) Appl. No.: 17/548,453

(22) Filed: Dec. 10, 2021

(65) Prior Publication Data
US 2022/0187105 A1    Jun. 16, 2022

(30) Foreign Application Priority Data

Dec. 11, 2020  (JP) ................... 2020-205487
Aug. 16, 2021  (JP) ................... 2021-132331

(51) Int. Cl.
*G01D 5/24* (2006.01)
*G01D 5/244* (2006.01)

(52) U.S. Cl.
CPC ................. *G01D 5/2448* (2013.01)

(58) Field of Classification Search
CPC ................................................. G01D 5/2448
USPC ....................................................... 702/104
See application file for complete search history.

(56) References Cited

U.S. PATENT DOCUMENTS

| | | | |
|---|---|---|---|
| 5,943,639 A * | 8/1999 | Tanaka | G01D 5/24404 702/158 |
| 6,401,052 B1 * | 6/2002 | Herb | G01D 5/2448 356/498 |
| 2006/0076480 A1 * | 4/2006 | Kiriyama | G01D 18/001 250/231.16 |
| 2008/0228423 A1 * | 9/2008 | Hayashi | G01D 5/24409 702/94 |

FOREIGN PATENT DOCUMENTS

JP    H08-122097 A    5/1996

* cited by examiner

*Primary Examiner* — Aditya S Bhat
(74) *Attorney, Agent, or Firm* — IP Business Solutions, LLC (57) ABSTRACT

An automatic correction method, for an encoder system for reading periodic signals on a scale as "SIN" and "COS" signals and converting the periodic signals into position signals, includes performing feedback to the "SIN" or "COS" signal to reduce an interpolation error after the conversion.

12 Claims, 7 Drawing Sheets

AUTOMATIC CORRECTION METHOD

CROSS REFERENCE TO RELATED APPLICATIONS

This application claims priority to Japanese Patent Application No. 2020-205487 filed on Dec. 11, 2020, and Japanese Patent Application No. 2021-132331 filed on Aug. 16, 2021, which are incorporated herein by reference in their entireties.

BACKGROUND OF INVENTION

1. Field

The present invention relates to an automatic correction method for automatically correcting a signal output from an encoder to reduce an interpolation error of the output signal.

2. Description of Related Art

An interpolator of a laserscale interpolates position data on the basis of counts of "SIN" and "COS" waveforms from sensors on the basis of the waveforms. An error of interpolated position data compared with a true value is called an interpolation error. Interpolation errors are caused by (1) a deviation of the center position of a Lissajous waveform formed by "SIN" and "COS" waveforms, (2) a deviation of the amplitudes of "SIN" and "COS" from each other, and (3) a deviation of the phase difference between "SIN" and "COS" from 90 degrees. In a method of related art, any of (1) to (3) is obtained by computation from instantaneous values of the "SIN" and "COS" waveforms at a specified phase (refer to Patent Literature 1).

RELATED ART LIST

Patent Literature 1: JP H08-122097 A

In a typical interpolator, when an offset of "COS" occurs, for example, the angle of a point on the circumference of the Lissajous waveform with respect to the center thereof is deviated. This angle is used for calculation of position data, which results in an interpolation error.

In the method of the related art, an offset of "COS" is detected and corrected as follows, for example. An average of a positive peak value ("COS"+) and a negative peak value ("COS"−) of the "COS" waveform is assumed to be a center value, and the "COS" waveform is biased so that the center value becomes 0.

When a noise waveform is superimposed on a "COS" waveform, an additional positive peak value (N+) of the noise is reflected in a detected positive peak value. Similarly, a negative peak value (N−) is reflected in a detected negative peak value. In this case, the average of the positive peak value ("COS"+) and the negative peak value ("COS"−) is not affected if the magnitudes of N+ and N− are equal to each other. If the magnitudes of N+ and N− are different from each other, however, the average of the positive peak value ("COS"+) and the negative peak value ("COS"−) is deviated by (N++N−) (≠0).

Thus, in the method of the related art, application of noise having a vertically asymmetric waveform causes an error in a detected offset value. When the amount of noise at detection of the positive peak value and that at the negative peak value are different from each other, an error occurs in a detected offset value. More specifically, in a laserscale, the detected position ideally varies in proportion to the movement distance of a sensor head or a scale. When an offset is present, however, a wave-like fluctuation is superimposed on the variation. This fluctuation appears as an error in the detected position, that is, an interpolation error. Examples of the causes of interpolation errors include, in addition to the offsets, amplitude errors, phase errors, and the like, which will be described later.

For an encoder system for reading periodic signals on a signal scale as "SIN" and "COS" signals and converting the periodic signals into position signals, it is desired to provide an automatic correction method for correcting "SIN" and "COS" signals that is less affected by noise and waveform distortion included in the signals.

SUMMARY OF INVENTION

In an encoder system for reading periodic signals on a scale as "SIN" and "COS" signals and converting the periodic signals into position signals, an automatic correction method according to an embodiment of the present invention includes detecting an offset of the "SIN" or "COS" signal, and feeding back the offset to the "SIN" or "COS" signal to make the offset smaller so as to reduce an interpolation error after the conversion. A component synchronous with a sine or cosine wave is extracted from a radius variation waveform of a Lissajous waveform formed by the "SIN" and "COS" signals to obtain the offset of the "SIN" signal or the "COS" signal.

According to this automatic correction method, in order to keep the radius of the Lissajous waveform formed by the "SIN" and "COS" signals from the scale constant, sine and cosine components having the same period as the "SIN" and "COS" signals, sine and cosine components having a period of ½ the period of the "SIN" and "COS" signals, and, furthermore, sine and cosine components having a period of 1/n (n=3, 4, . . . ) the period of the "SIN" and "COS" signals are extracted, and the extracted components are fed back to the "SIN" and "COS" signals from the scale.

In an encoder system for reading periodic signals on a scale as "SIN" and "COS" signals and converting the periodic signals into position signals, an automatic correction method according to another embodiment of the present invention includes detecting an amplitude difference or a phase difference between the "SIN" and "COS" signals, and feeding back the amplitude difference or the phase difference to the "SIN" or "COS" signal to make the amplitude difference closer to 0 or make the phase difference closer to 90 degrees so as to reduce an interpolation error after the conversion. A component synchronous with a sine or cosine wave with a period of ½ period the period of the "SIN" or "COS" signal is extracted from a radius variation waveform of a Lissajous waveform formed by the "SIN" and "COS" signals to obtain the amplitude difference or the phase difference between the "SIN" signal and the "COS" signal.

The present invention provides an automatic correction method for correcting "SIN" and "COS" signals for an encoder system for reading periodic signals on a scale as "SIN" and "COS" signals and converting the periodic signals into position signals, which is less affected by noise and waveform distortion contained in signals.

DETAILED DESCRIPTION

An embodiment of the present invention will now be described with reference to the drawings.

An automatic correction method (correction device) of the embodiment is applied to an encoder system for calculating displacement information on the basis of two sinusoidal signals output from an encoder and having a phase difference of 90 degrees from each other, and corrects the sinusoidal signals prior to the calculation of the displacement information. Hereinafter, the two sinusoidal signals are referred to as a sine wave and a cosine wave, and represented by "SIN" and "COS", respectively.

When an offset is present in either of "SIN" and "COS", the radius of a Lissajous waveform drawn by "SIN" and "COS" varies. In the embodiment, this radius variation is used for detecting an offset amount depending on the degree of the radius variation. In addition, in a waveform expressing the radius variation (hereinafter also referred to as a "radius variation waveform"), a component synchronous with "COS" and a component synchronous with "SIN" are proportional to the offset amounts of "COS" and "SIN", respectively. Similarly, when the radius variation waveform changes twice during a period of the Lissajous waveform, a gain difference (amplitude difference) between "SIN" and "COS" and a phase difference between "SIN" and "COS" can be detected on the basis of the phase of the Lissajous waveform.

Specifically, a Lissajous waveform can be obtained from two sinusoidal signals output from an encoder, and correction values can be calculated on the basis of the variation of the radius during one period of the obtained Lissajous waveform. The sinusoidal signals can be corrected on the basis of the correction values. Details thereof will be described hereinafter.

Figure 1:
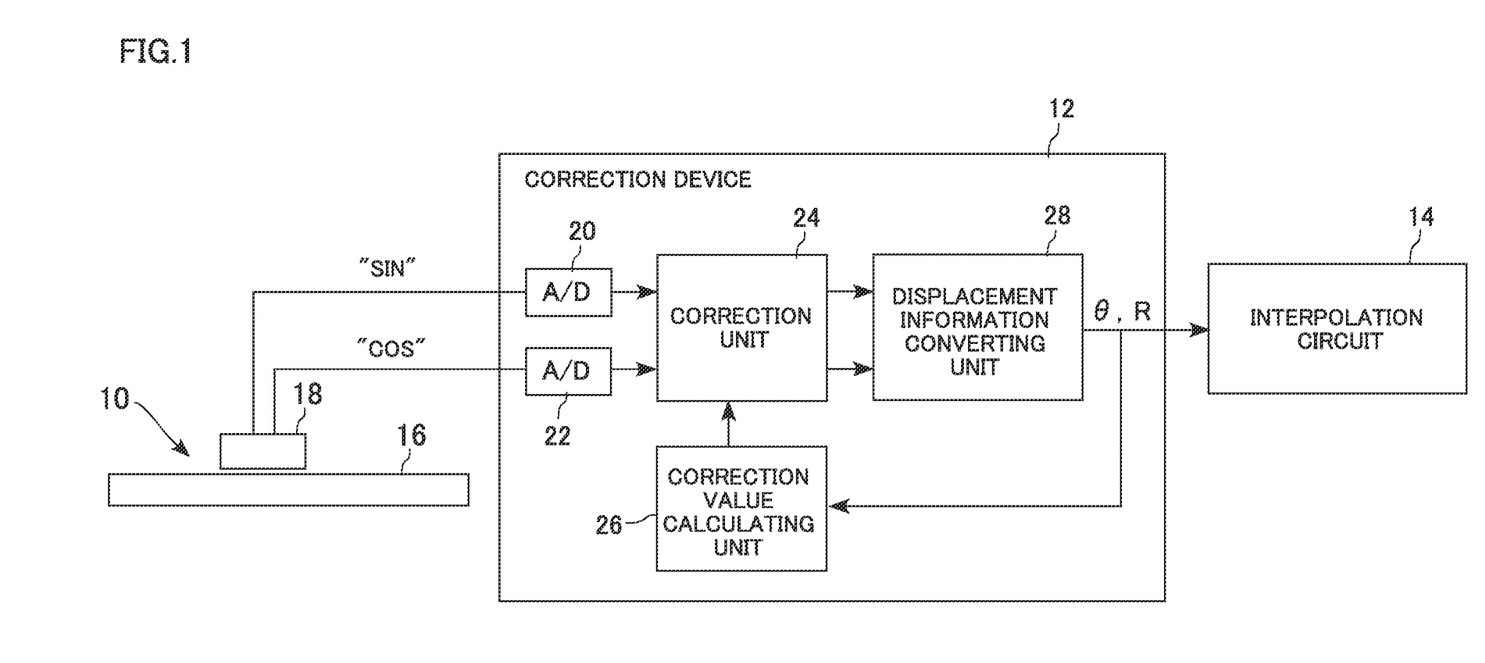
FIG. 1 is a diagram schematically illustrating an encoder system according to an embodiment.

FIG. 1 is a diagram schematically illustrating an encoder system according to the embodiment.

The encoder system includes an encoder 10, a correction device 12, an interpolation circuit (interpolator) 14, etc. The encoder 10 is an optical or magnetic linear encoder, for example, and includes a scale 16 and a sensor head 18.

The correction device 12 includes A/D converters 20 and 22, a correction unit 24, a correction value calculating unit 26, and a displacement information converting unit 28. The "SIN" and "COS" signals from the sensor head 18 are sampled at a predetermined frequency by the A/D converters 20 and 22, and converted into digital signals. The correction device 12 processes the digital signals.

The correction value calculating unit 26 calculates errors to be corrected (correction errors) to obtain correction values by an automatic correction method, which will be described later. The correction errors correspond to the variation amounts of the radius variation waveform, and include offset errors, amplitude errors, phase errors, correction errors caused by second order distortion, correction errors caused by third order distortion, and the like (details thereof will be described later). The correction unit 24 corrects the correction errors of the "SIN" and "COS" signals on the basis of the correction values calculated by the correction value calculating unit 26. The displacement information converting unit 28 converts the corrected "SIN" and "COS" signals into displacement information for the interpolation circuit 14 and the correction value calculating unit 26.

The displacement information includes information of the radius $R(\theta)$, at each phase angle $\theta$, of the Lissajous waveform obtained after the correction. The displacement information is fed back to the correction value calculating unit 26. The interpolation circuit 14 performs interpolation division of a Lissajous waveform of the corrected signals to increase the detection accuracy of the encoder 10, the explanation of which is omitted herein.

FIGS. 2A to 6B are graphs illustrating the principle of the automatic correction method according to the embodiment.

Figure 2A:
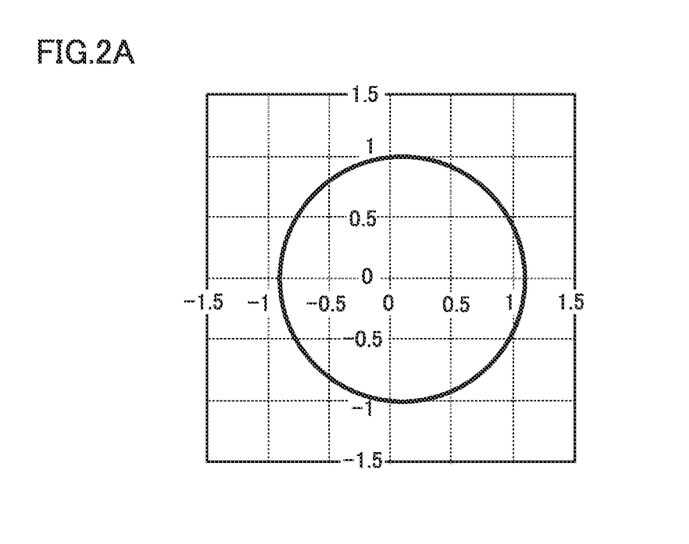
FIGS. 2A and 2B are graphs illustrating the principle of an automatic correction method according to the embodiment.
Figure 2B:
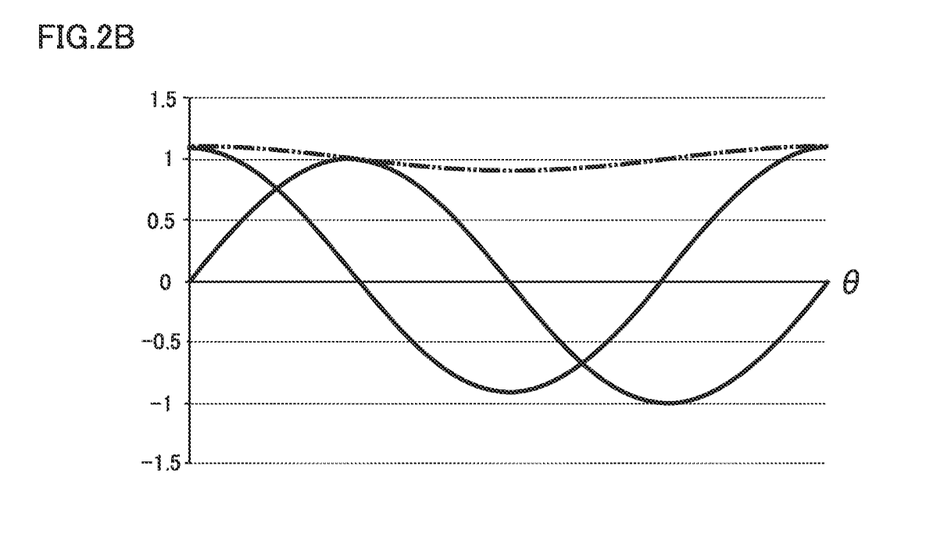
Figure 3A:
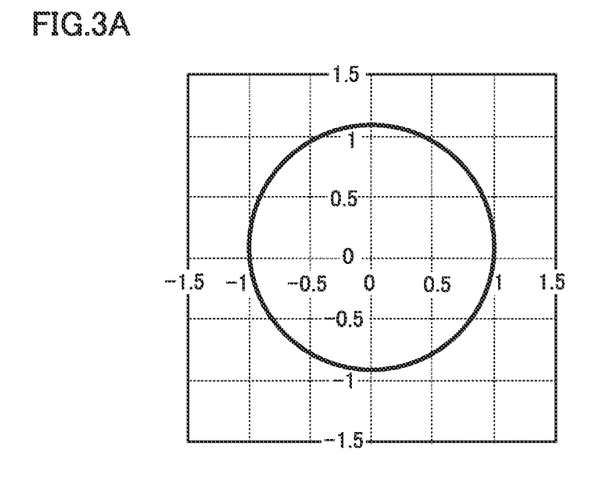
FIGS. 3A and 3B are graphs illustrating the principle of the automatic correction method according to the embodiment.
Figure 3B:
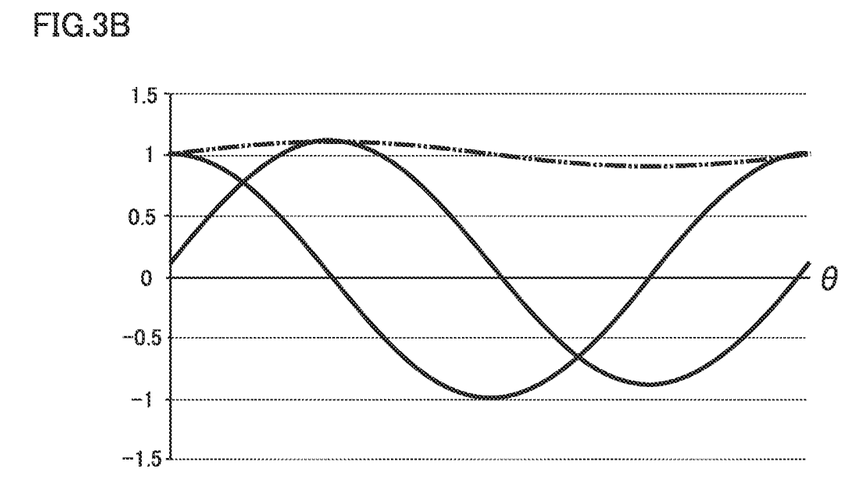
Figure 4A:
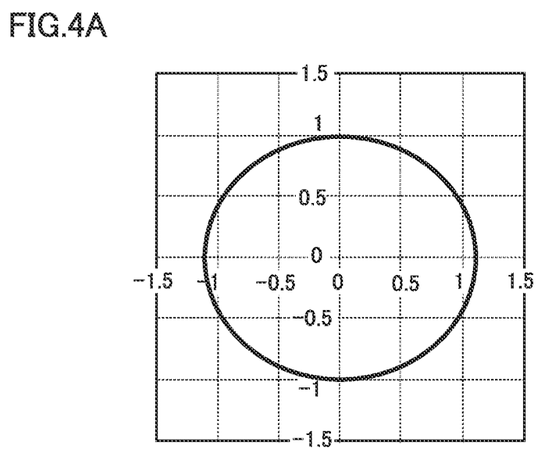
FIGS. 4A and 4B are graphs illustrating the principle of the automatic correction method according to the embodiment.
Figure 4B:
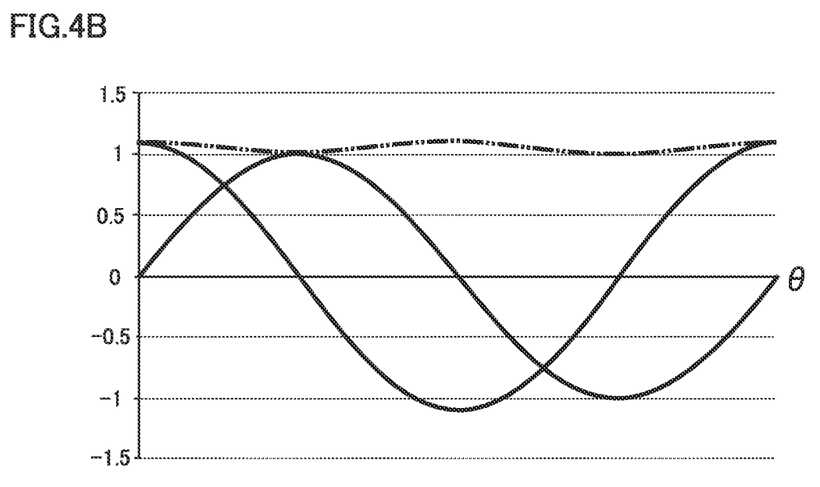
Figure 5A:
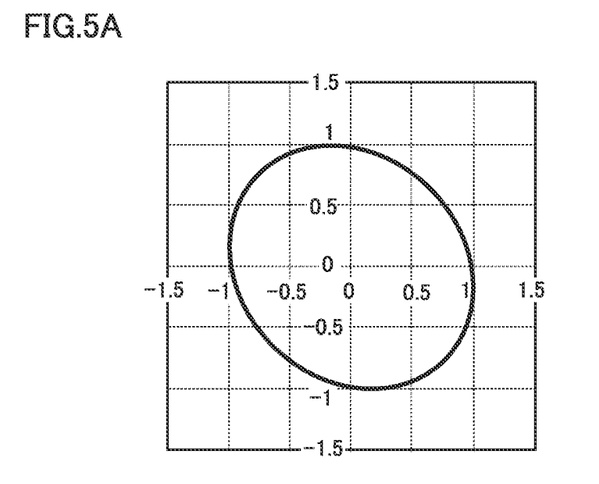
FIGS. 5A and 5B are graphs illustrating the principle of the automatic correction method according to the embodiment.
Figure 5B:
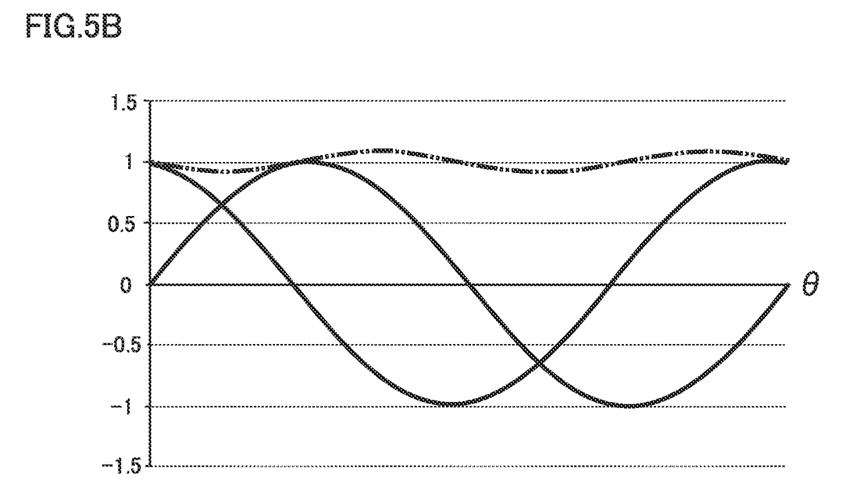
Figure 6A:
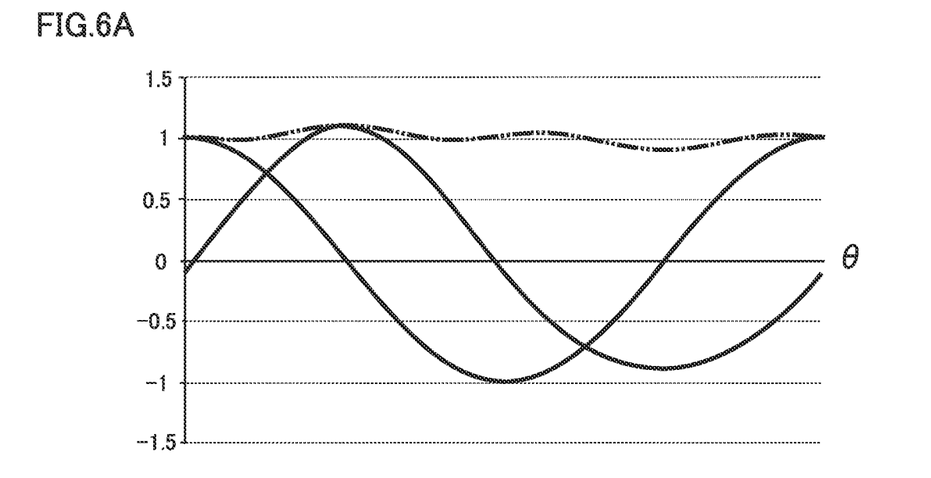
FIGS. 6A and 6B are graphs illustrating the principle of the automatic correction method according to the embodiment.
Figure 6B:
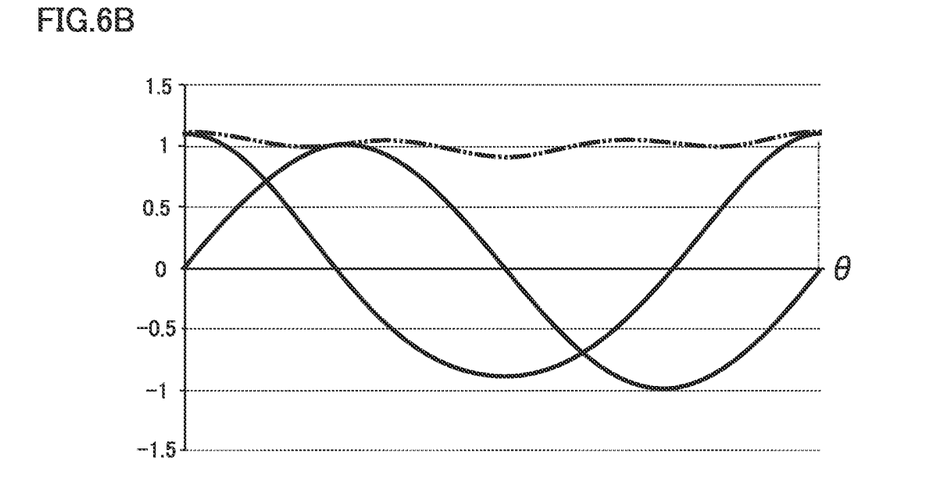

FIGS. 2A, 2B, 3A and 3B illustrate a method for detecting offset errors, FIGS. 4A and 4B illustrate a method for detecting amplitude errors, and FIGS. 5A and 5B illustrate a method for detecting phase errors. FIGS. 2A, 3A, 4A, 5A, and 6A illustrate Lissajous waveforms, and FIGS. 2B, 3B, 4B, 5B, and 6B illustrate waveforms of the sinusoidal signals (solid lines) and the radius variation waveform (two-dot chain line). FIGS. 6A and 6B illustrate a method for detecting second order distortion. FIG. 6A illustrates a case where "SIN" contains second order distortion, and FIG. 6B illustrates a case where "COS" contains second order distortion. Note that $\theta$ represents the phase angle of the Lissajous waveform.

[1] Detection of Offset ("COS"): FIGS. 2A and 2B

In a case where the waveform "COS" input to the correction device 12 has an offset Bc, the Lissajous radius $R=\sqrt{(\text{"SIN"}^2 + \text{"COS"}^2)}$ varies as expressed by the two-dot chain line in FIG. 2(B) (FIG. 2B illustrates a case of Bc=0.1). Specifically, the Lissajous radius $R(\theta)$ has a radius variation waveform with the same period as "COS", and contains a correction error.

The offset Bc is obtained by the following formula (1) on the basis of the radius $R(\theta)$:

$$Bc = \int (R(\theta) \cdot \cos\theta) d\theta / 2\pi \quad (1)$$

This is to obtain a $\cos\theta$ component of $R(\theta)$. Thus, the offset of one sinusoidal signal can be calculated by extracting a component synchronous with the cosine wave corresponding to this sinusoidal signal from the variation of the radius of the Lissajous waveform.

[2] Detection of Offset ("SIN"): FIGS. 3A and 3B

In a case where the waveform "SIN" input to the correction device 12 has an offset Bs, the Lissajous radius $R=\sqrt{(\text{"SIN"}^2 + \text{"COS"}^2)}$ varies as expressed by the two-dot chain line in FIG. 3B (FIG. 3B illustrates a case of Bs=0.1). Specifically, the Lissajous radius $R(\theta)$ has a radius variation waveform with the same period as "SIN", and contains a correction error.

The offset Bs is obtained by the following formula (2) on the basis of the radius $R(\theta)$:

$$Bs = \int (R(\theta) \cdot \sin\theta) d\theta / 2\pi \quad (2)$$

This is to obtain a sine component of $R(\theta)$. Thus, the offset of the other sinusoidal signal can be calculated by extracting a component synchronous with the sine wave corresponding to the other sinusoidal signal from the variation of the radius of the Lissajous waveform.

[3] Detection of Amplitude Difference: FIGS. 4A and 4B

In a case where the waveform "COS" input to the correction device has an amplitude larger by G than that of "SIN", the Lissajous radius $R=\sqrt{(\text{"SIN"}^2+\text{"COS"}^2)}$ varies as expressed by the two-dot chain line in FIG. 4B (FIG. 4B illustrates a case of G=0.1). Specifically, the Lissajous radius $R(\theta)$ varies has a radius variation waveform with a period of half (½) the period of "COS", and contains a correction error.

The amplitude difference G is obtained by the following formula (3) on the basis of the radius $R(\theta)$:

$$G=\int R(\theta)\cdot\cos(2\theta)\cdot d\theta/2\pi \quad (3)$$

This is to obtain a $\cos(2\theta)$ component of $R(\theta)$. Thus, the amplitude difference between the two sinusoidal signals can be calculated by extracting a component synchronous with the cosine wave with a period of ½ the period of one sinusoidal signal from the variation of the radius of the Lissajous waveform.

[4] Detection of Phase Difference: FIGS. 5A and 5B

In a case where the input waveform "COS" has a phase greatly shifted by P, the Lissajous radius $R=\sqrt{(\text{"SIN"}^2+\text{"COS"}^2)}$ varies as expressed by the two-dot chain line in FIG. 5B (FIG. 5B illustrates a case of P=10°). Specifically, the Lissajous radius $R(\theta)$ has a radius variation waveform with a period of half (½) the period of "SIN", and contains a correction error.

The phase difference P is obtained by the following formula (4) on the basis of the radius $R(\theta)$:

$$P=\int R(\theta)\cdot\sin(2\theta)\cdot d\theta/2\pi \quad (4)$$

This is to obtain a $\sin(2\theta)$ component of $R(\theta)$. Thus, the phase difference between the two sinusoidal signals can be calculated by extracting a component synchronous with the sine wave with a period of ½ the period of the other sinusoidal signal from the variation of the radius of the Lissajous waveform.

[5] Detection of Radius

In the embodiment, for detecting the Lissajous radius $R=\sqrt{(\text{"SIN"}^2+\text{"COS"}^2)}$ itself, the average of R can be calculated by the following formula (5):

$$R=\int r(\theta)d\theta/2\pi \quad (5)$$

[6] Detection of Second Order Distortion: FIGS. 6A and 6B

In a case where the "SIN" waveform contains second order distortion (Ds·(sin θ)²), the Lissajous radius $R=\sqrt{(\text{"SIN"}^2+\text{"COS"}^2)}$ varies as expressed by the two-dot chain line in FIG. 6A (FIG. 6A illustrates a case of Ds=0.2). Specifically, the Lissajous radius $R(\theta)$ has a radius variation waveform with a period of one-third (⅓) the period of "SIN", and contains a correction error.

Ds represents an amplitude of the second order distortion (referred to as a "second order distortion amplitude"), and is obtained by the following formula (6) on the basis of the radius $R(\theta)$:

$$Ds=\int R(\theta)\cdot\sin(3\theta)\cdot d\theta/2\pi \quad (6)$$

This is to obtain a $\sin(3\theta)$ component of $R(\theta)$. Thus, the second order distortion of one sinusoidal signal can be calculated by extracting a component synchronous with the sine wave with a period of ⅓ the period of this sinusoidal signal from the variation of the radius of the Lissajous waveform.

In contrast, in a case where the "COS" waveform contains second order distortion (Dc·(cos θ)²), the Lissajous radius $R=\sqrt{(\text{"SIN"}^2+\text{"COS"}^2)}$ varies as expressed by the two-dot chain line in FIG. 6B (FIG. 6B illustrates a case of Dc=0.2). Specifically, the Lissajous radius $R(\theta)$ has a radius variation waveform with a period of one-third the period of "COS", and contains a correction error.

Dc represents an amplitude of the second order distortion (referred to as a "second order distortion amplitude"), and is obtained by the following formula (7) on the basis of the radius $R(\theta)$:

$$Dc=\int R(\theta)\cdot\cos(3\theta)\cdot d\theta/2\pi \quad (7)$$

This is to obtain a $\cos(3\theta)$ component of $R(\theta)$. Thus, the second order distortion of the other sinusoidal signal can be calculated by extracting a component synchronous with the cosine wave with a period of ⅓ the period of the other sinusoidal signal from the variation of the radius of the Lissajous waveform.

Figure 7:
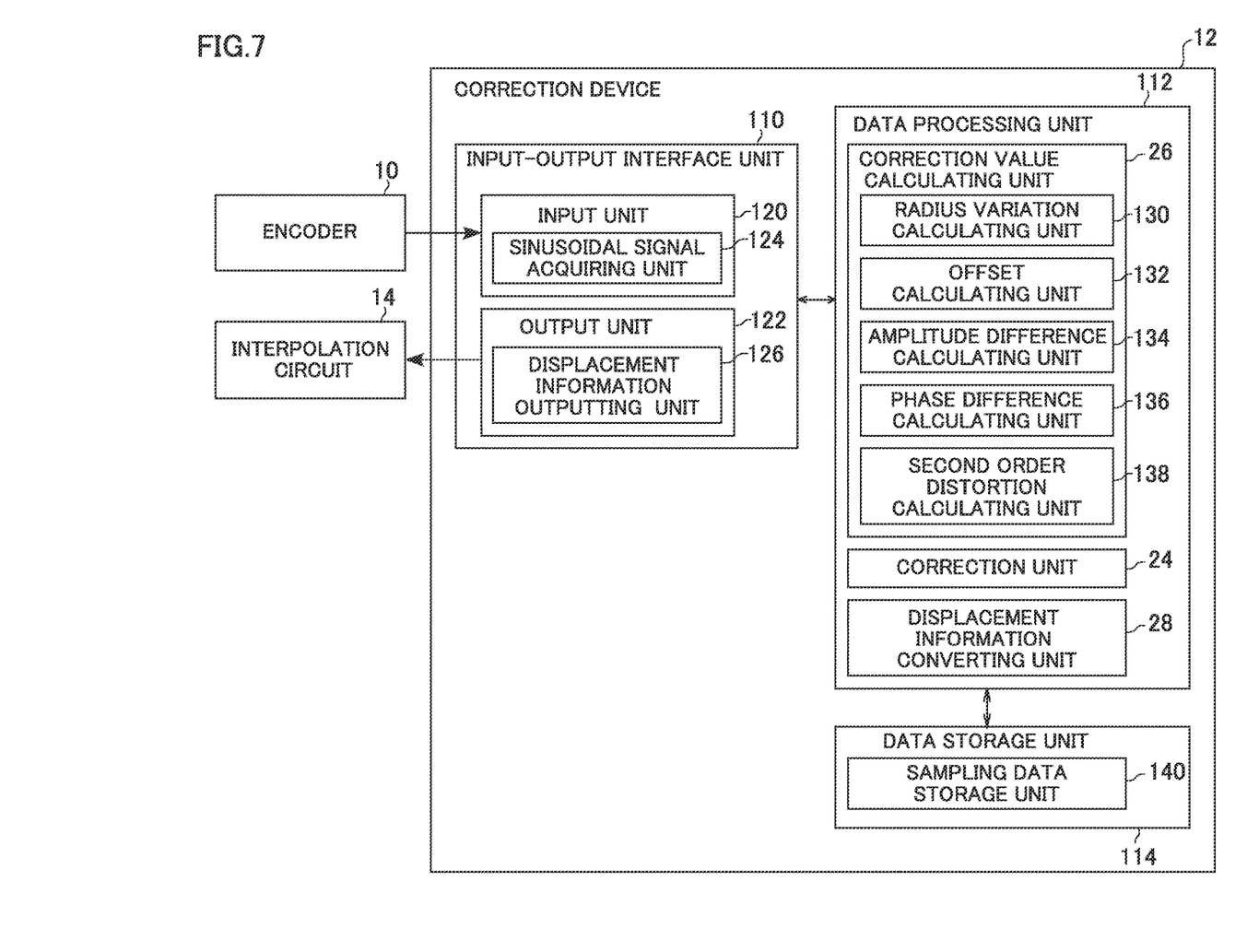
FIG. 7 is a functional block diagram of a correction device.

Next, a configuration and specific operations of the correction device 12 will be described.

FIG. 7 is a functional block diagram of the correction device 12.

Components of the correction device 12 are implemented by hardware including computing units such as field programmable gate arrays (FPGAs) and various computer processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Blocks to be described below do not refer to configurations in units of hardware but to blocks in units of functions.

The correction device 12 includes an input-output interface unit 110, a data processing unit 112, and a data storage unit 114. The input-output interface unit 110 performs processes relating to an input-output interface including data exchange external devices. The data processing unit 112 performs various processes on the basis of data obtained by the input-output interface unit 110 and data stored in the data storage unit 114. The data processing unit 112 also functions as an interface of the input-output interface unit 110 and the data storage unit 114. The data storage unit 114 stores various programs and set data.

The input-output interface unit 110 includes an input unit 120 and an output unit 122.

The input unit 120 includes a sinusoidal signal acquiring unit 124. The sinusoidal signal acquiring unit 124 includes the functions of the A/D converters 20 and 22, and acquires sinusoidal signals ("SIN" and "COS") as digital signals from the encoder 10.

The data storage unit 114 includes a sampling data storage unit 140. The sampling data storage unit 140 stores sampling data of the Lissajous radius R acquired with a predetermined sampling period. The data storage unit 114 includes a memory that functions as a working area for the data processing unit 112 to perform arithmetic processing.

The data processing unit 112 includes the correction unit 24, the correction value calculating unit 26, and the displacement information converting unit 28 described above. The correction value calculating unit 26 includes a radius variation calculating unit 130, an offset calculating unit 132, an amplitude difference calculating unit 134, a phase difference calculating unit 136, and a second order distortion calculating unit 138. The radius variation calculating unit 130 performs arithmetic processing based on the formula (5) on the basis of the sampling data stored in the sampling data storage unit 140, to calculate the variation (radius variation waveform) of the radius $R(\theta)$ of the Lissajous waveform.

The offset calculating unit 132 performs arithmetic processing based on the formulas (1) and (2) on the radius $R(\theta)$ stored in the data storage unit 140, to calculate offsets of the two sinusoidal signals. The amplitude difference calculating unit 134 performs arithmetic processing based on the formula (3) on the radius $R(\theta)$, to calculate the amplitude difference between the two sinusoidal signals. The phase difference calculating unit 136 performs arithmetic processing based on the formula (4) on the radius $R(\theta)$, to calculate the phase difference between the two sinusoidal signals. The second order distortion calculating unit 138 performs arithmetic processing based on the formulas (6) and (7) on the radius $R(\theta)$, to calculate second order distortions of the two sinusoidal signals.

The correction unit 24 corrects the sinusoidal signals by using correction values obtained by amplifying and integrating the calculated correction errors. The displacement information converting unit 28 converts the corrected sinusoidal signals into displacement information, and feeds back the displacement information to the correction value calculating unit 26. The displacement information is stored in the sampling data storage unit 140, and updated each time the correction process is repeated. As the correction process is repeated, the correction errors become smaller.

The output unit 122 includes a displacement information outputting unit 126. The displacement information outputting unit 126 outputs, to the interpolation circuit 14, the displacement information from which correction errors are removed or with smaller correction errors resulting from the correction.

In the configuration described above, the correction value calculating process performed by the correction value calculating unit 26 is based on the automatic correction method based on the formulas (1) to (7) In the embodiment, the arithmetic processing therefor is performed discretely. Specific details thereof are as follows.

[Calculation of radius Rn]

First, the radius variation calculating unit 130 obtains a Lissajous waveform corresponding to one period from the two sinusoidal signals "SIN" and "COS". The radius variation calculating unit 130 then divides the phase angle of the Lissajous waveform into N regions (intervals of 45 degrees each when N=8, for example), and obtains sample data Rn (n is an integer from 0 to N−1) of the Lissajous radius at a phase of each region. Specifically, accumulators for individual phases may be used for saving the radius Rn (n is an integer from 0 to N−1) in the individual regions. In this case, the phase is divided into N phase regions, N being from 0 to N−1.

The N phase regions may be equal to each other, or may be regions each including zero-crossing points of "SIN" and "COS" and crossing points "SIN" and "COS" as described in Japanese Patent No. 3367226, for example.

The accumulators for individual phases may each be implemented by an integrating circuit including a delay element for causing a delay of one sampling period, and a feedback multiplier, for example. This smooths data in each region each time new sampling data are input. Thus, the value of the radius variation waveform of the Lissajous waveform can be a smoothed value obtained by passing the radius in a current interval n through a low-pass filter. The smoothing removes or reduces noise superimposed on the radius variation, and enables stable detection of a cause of an interpolation error.

More specifically, data with superimposed noise are continuously acquired for each interval of the phase regions, and noise is removed therefrom by low-pass filters. The data resulting from noise removal are sampled at predetermined points at the intervals (the points being stable points such as just before next intervals), and a sampled value can be assumed to be the radius value in the corresponding phase region of the Lissajous waveform. Alternatively, the sampling can be performed for a plurality of periods, an average of the sampled values in each interval can be obtained, and the average can be assumed to be the radius value in the corresponding phase region of the Lissajous waveform. The smoothing and averaging as described above are repeated, which allows the tendencies of correction error in view of variation caused by the operation of the scale to be obtained and improves noise removal performance.

[Calculation of Offset]

The offset calculating unit 132 calculates the offset Bc of "COS" on the basis of the following formula (8):

$$Bc = \sum_{n=0}^{N-1} Rn \cdot \cos\left(2\pi \frac{n}{N}\right) \quad (8)$$

Specifically, for extracting a component synchronous with "COS" from the radius variation waveform of the Lissajous waveform, a value obtained by averaging results of multiplying the radius variation waveform by $\cos(2\pi n/N)$ over the most recent one period of the Lissajous waveform can be assumed to be the offset Bc. Note that N is an even natural number, and n is an integer from 0 to N−1 proportional to the phase of the Lissajous waveform in one period.

Similarly, the offset calculating unit 132 calculates the offset Bs of "SIN" on the basis of the following formula (9):

$$Bs = \sum_{n=0}^{N-1} Rn \cdot \sin\left(2\pi \frac{n}{N}\right) \quad (9)$$

Specifically, for extracting a component synchronous with "SIN" from the radius variation waveform of the Lissajous waveform, a value obtained by averaging results of multiplying the radius variation waveform by $\sin(2\pi n/N)$ over the most recent one period of the Lissajous waveform can be assumed to be the offset Bs. Note that N is an even natural number, and n is an integer from 0 to N−1 proportional to the phase of the Lissajous waveform in one period.

[Calculation of Amplitude Difference]

The amplitude difference calculating unit 134 calculates the amplitude difference G on the basis of the following formula (10):

$$G = \sum_{n=0}^{N-1} Rn \cdot \cos\left(4\pi \frac{n}{N}\right) \quad (10)$$

Specifically, for extracting a component synchronous with a ½ period of "SIN" from the radius variation waveform of the Lissajous waveform, a value obtained by averaging results of multiplying the radius variation waveform by cos(4πn/N) over the most recent one period of the Lissajous waveform can be assumed to be the amplitude difference G. Note that N is an even natural number, and n is an integer from 0 to N−1 proportional to the phase of the Lissajous waveform in one period.

[Calculation of Phase Difference]

The phase difference calculating unit 136 calculates the amplitude difference G on the basis of the following formula (11):

$$P = \sum_{n=0}^{N-1} Rn \cdot \sin\left(4\pi \frac{n}{N}\right) \quad (11)$$

Specifically, for extracting a component synchronous with a ½ period of "SIN" from the radius variation waveform of the Lissajous waveform, a value obtained by averaging results of multiplying the radius variation waveform by sin(4πn/N) over the most recent one period of the Lissajous waveform can be assumed to be the phase difference P. Note that N is an even natural number, and n is an integer from 0 to N−1 proportional to the phase of the Lissajous waveform in one period.

[Calculation of Second Order Distortion]

The second order distortion calculating unit 138 calculates the second order distortion amplitude Ds of "SIN" on the basis of the following formula (12), and the second order distortion amplitude Dc of "COS" on the basis of the following formula (13):

$$Dc = \sum_{n=0}^{N-1} Rn \cdot \cos\left(6\pi \frac{n}{N}\right) \quad (12)$$

$$Ds = \sum_{n=0}^{N-1} Rn \cdot \sin\left(6\pi \frac{n}{N}\right) \quad (13)$$

Specifically, for extracting a component synchronous with a ⅓ period of "SIN" relevant to the second order distortion of the "SIN" waveform from the radius variation waveform of the Lissajous waveform, a value obtained by averaging results of multiplying the radius variation waveform by sin(6πn/N) over the most recent one period of the Lissajous waveform may be assumed to be Ds. For extracting a component synchronous with a ⅓ period of "COS" relevant to the second order distortion of the "COS" waveform from the radius variation waveform of the Lissajous waveform, a value obtained by averaging results of multiplying the radius variation waveform by cos(6πn/N) over the most recent one period of the Lissajous waveform may be assumed to be Dc. Note that N is an even natural number, and n is an integer from 0 to N−1 proportional to the phase of the Lissajous waveform in one period.

In view of implementation by FPGAs or the like, however, a smaller number of bits in multiplication is more convenient. Thus, sin(2πn/N), cos(2πn/N), sin(4πn/N), cos(4πn/N), sin(6πn/N), and cos(6πn/N) used in the above-described discretization may be replaced by results of quantizing sin(2πn/N), cos(2πn/N), sin(4πn/N), cos(4πn/N), sin(6πn/N), and cos(6πn/N), respectively, to reduce the number of bits to at least one bit. Specifically, for weight coefficients used in multiplication of the Lissajous radius Rn by these values, three values of 0 and ±1 may be set, for example. If these values are not quantized, the weight coefficients may be decimals, which makes arithmetic algorithms complicated. This can be avoided, however, by quantization.

Note that, in view of calculation of the amplitude difference and the phase difference as well, N=16 (which means division into 16 regions) is preferable rather than N=8. Specifically, regarding weight coefficients for the offsets, when the values of sin(2πn/N) where n=0 to 15 are represented by S1 to S16, respectively, S1, S8, S9, and S16 can be assumed to be 0, S2 to S7 can be assumed to be 1, and S10 to S15 can be assumed to be −1. When the values of cos(2πn/N) where n=0 to 15 are represented by C1 to C16, respectively, C1 to C3 and C14 to C16 can be assumed to be 1, C4, C5, C12, and C13 can be assumed to be 0, and C6 to C11 can be assumed to be −1.

In addition, regarding weight coefficients for the amplitude difference, when the values of cos(4πn/N) where n=0 to 15 are represented by G1 to G16, respectively, G1, G2, G8 to G10, and G16 can be assumed to be 1, G3, G7, G11, and G15 can be assumed to be 0, and G4 to G6 and G12 to G14 can be assumed to be −1. Regarding weight coefficients for the phase difference, when the values of sin(4πn/N) where n=0 to 15 are represented by P1 to P16, respectively, P1, P5, P9 and P13 can be assumed to be 0, P2 to P4 and P10 to P12 can be assumed to be 1, and P6 to P8 and P14 to P16 can be assumed to be −1.

An automatic correction method has been described above according to the embodiment.

In the method of the related art, a radius and an offset are obtained from peak values of "SIN" and "COS" waveforms, which are likely to be affected by a noise waveform at instants of peaks. According to the method of the embodiment, however, "SIN" and "COS" components are obtained by the averaging process such as integration over one period of the "SIN" and "COS" waveforms, which are less affected by noise and make detection values such as offsets stable. As a result, a residual error of an interpolation error caused by noise is small.

Similarly, because detection values such as offsets are stable, the stability of the system when the values are fed back is increased. The feedback gain can be increased accordingly as compared with the method of the related art, and as a result, the response speed can be increased.

In addition, because a second order distortion or a third order distortion included in "SIN" and "COS" waveforms can also be detected by the method of the embodiment, an interpolation error caused by harmonic distortion, which is difficult to reduce by the method of the related art, can also be reduced.

More specifically, an actual "SIN" waveform, an actual "COS" waveform, and a radius variation waveform of a Lissajous waveform formed by the "SIN" waveform and the "COS" waveform contains noise or irregular fluctuation. As described above, in the method of the related art, when an average of a positive peak value ("COS"+) and a negative peak value ("COS"−) of a "COS" waveform is assumed to be a center value of the "COS" waveform and a deviation of the center value from 0 is assumed to be an offset in offset detection, this is likely to be affected by noise or the like. The same can be said about detection of a phase difference and detection of an amplitude difference between "SIN" and "COS" in addition to the offset detection, which is a reason for which an interpolation error contained in a displacement signal resulting from feedback of these detected values cannot be made smaller than a certain level. Although noise can be reduced by a low-pass filter with a certain cutoff frequency, the cutoff frequency cannot be sufficiently lowered in view of ensuring the accuracy of peak value detection, and the influence of noise cannot be sufficiently avoided.

In this regard, according to the embodiment, the peak values of the "SIN" and "COS" waveforms described above are not used, and the causes of interpolation errors including offsets are detected by using periodic components (a frequency component and a harmonic component) of the radius variation waveform over at least one period, which enables noise reduction with a cutoff frequency of about several times the frequency of "SIN" and "COS". Thus, combination of detection of periodic components of the radius variation waveform and use of a low-pass filter with a sufficiently low cutoff frequency allows interpolation errors to be reduced to such a level that cannot be achieved in the related art.

For some noise or irregular fluctuation included in an actual "SIN" waveform, an actual "COS" waveform, and a radius variation waveform of a Lissajous waveform formed by the "SIN" waveform and the "COS" waveform, it may be better to perform averaging over several periods or longer of the "SIN" waveform and the "COS" waveform. For example, the distance between a scale and a sensor head may irregularly fluctuate while the scale of the sensor head moves, and the amplitudes or the like of the "SIN" waveform and the "COS" waveform may fluctuate accordingly. In this case, if a low-pass filter with a long time constant over the entire period of the radius variation waveform is introduced, a periodic component of the radius variation waveform is also attenuated, which may make it difficult to detect causes of interpolation errors including offsets. This is because the influence of noise on each phase region also affects other phase regions. Therefore, in the embodiment, N registers are provided, as the low-pass filters of the radius variation waveform, for respective ones of N sections resulting from division, and wavelength data in the respective sections are separately accumulated. As a result, the sections of the radius variation waveform can be averaged over a plurality of sections, and periodic components of the radius variation waveform are not attenuated.

Modification

Although not described in the embodiment, the correction may be performed by detecting third order distortion. Specifically, the third order distortion of one sinusoidal signal can be calculated by extracting a component synchronous with a ¼ period of the sine wave "SIN" corresponding to this sinusoidal signal from the variation of the radius of the Lissajous waveform. In addition, the third order distortion of the other sinusoidal signal can be calculated by extracting a component synchronous with a ¼ period of the cosine wave "COS" corresponding to the other sinusoidal signal from the variation of the radius of the Lissajous waveform.

Furthermore, for extracting a component synchronous with the ¼ period of "SIN" relevant to the third order distortion of the "SIN" waveform from the radius variation waveform of the Lissajous waveform, a value obtained by averaging results of multiplying the radius variation waveform by $\sin(8\pi n/N)$ over the most recent one period of the Lissajous waveform may be assumed to be the third order distortion. For extracting a component synchronous with the ¼ period of "COS" relevant to the third order distortion of the "COS" waveform from the radius variation waveform of the Lissajous waveform, a value obtained by averaging results of multiplying the radius variation waveform by $\cos(8\pi n/N)$ over the most recent one period of the Lissajous waveform may be assumed to be the third order distortion.

Note that $\sin(8\pi n/N)$ and $\cos(8\pi n/N)$ used in the above-described discretization may also be replaced by results of quantizing $\sin(8\pi n/N)$ and $\cos(8\pi n/N)$, respectively, to reduce the number of bits to at least one bit. Specifically, if the radius variation waveform is expressed in a plurality of bits (20 bits, for example) and multiplied by $\sin(8\pi n/N)$ and $\cos(8\pi n/N)$ for offset detection, two multipliers are needed. Furthermore, one multiplier is needed for each of the amplitude difference and the phase difference. This increases the circuit size. In this regard, if $\sin(8\pi n/N)$ and $\cos(8\pi n/N)$ are quantized to two values of ±1 or three values of 0 and ±1, multiplication becomes unnecessary, and the circuit size can be significantly reduced. In this case, the multiplication results include errors. In the embodiment, however, a detected offset or the like is amplified and fed back, and the detected value becomes ultimately extremely close to 0. Thus, an error in multiplication during the correction is negligible.

The "square of the radius" may be used instead of the "radius" of the radius variation waveform described above.

In the embodiment described above, an example in which a value obtained by passing a radius at each of N intervals (N is an integer), into which a Lissajous waveform corresponding to one period is divided, through the low-pass filter is assumed to be a value of the radius variation waveform of the Lissajous waveform has been presented. In addition, the cases of N=8 and N=16 have been presented. In a modification, N=24 may be used. For making the intervals correspond to the phase shift of 90 degrees between "SIN" and "COS", N is a multiple of 4. For calculation using a ⅓-period component, N is also a multiple of 3. For accuracy, these values may be multiplied by an integer of 2 or larger.

The present invention is not limited to the embodiment described above and modifications thereof, and any component thereof can be modified and embodied without departing from the scope of the invention. Components described in the embodiment and modifications can be combined as appropriate to form various embodiments. Some components may be omitted from the components presented in the embodiment and modifications.

What is claimed is:

1. An automatic correction method for an encoder system for reading periodic signals on a scale as "SIN" and "COS" signals and converting the periodic signals into position signals, the automatic correction method comprising:
   detecting an offset of the "SIN" or "COS" signal, and feeding back the offset to the "SIN" or "COS" signal to make the offset smaller so as to reduce an interpolation error after the conversion; and
   correcting the encoder using the offset after the detecting the offset,
   wherein a component synchronous with a sine or cosine wave is extracted from a radius variation waveform of a Lissajous waveform formed by the "SIN" and "COS" signals to obtain the offset of the "SIN" signal or the "COS" signal,
   wherein for extracting the component synchronous with the sine or cosine wave from the radius variation waveform of the Lissajous waveform, results of multiplying the radius variation waveform of the Lissajous waveform by $\sin(2\pi n/N)$ or $\cos(2\pi n/N)$ are averaged over a most recent one period of the Lissajous waveform, where N is an even natural number, and n is an integer from 0 to N−1 proportional to a phase of the Lissajous waveform in one period.

2. The automatic correction method according to claim 1, wherein each of sin(2πn/N) and cos(2πn/N) is quantized and expressed in two values of ±1 or three values of 0 and ±1.

3. The automatic correction method according to claim 1, wherein a value of the radius variation waveform of the Lissajous waveform is a value obtained by passing a radius at each of N intervals (N is an integer), into which the Lissajous waveform corresponding to one period is divided, through a low-pass filter.

4. The automatic correction method according to claim 1, wherein a "square of the radius" is used instead of the "radius".

5. An automatic correction method for an encoder system for reading periodic signals on a scale as "SIN" and "COS" signals and converting the periodic signals into position signals, the automatic correction method comprising:
   detecting an amplitude difference or a phase difference between the "SIN" and "COS" signals, and feeding back the amplitude difference or the phase difference to the "SIN" or "COS" signal to make the amplitude difference closer to 0 or make the phase difference closer to 90 degrees so as to reduce an interpolation error after the conversion; and
   correcting the encoder using the amplitude difference or the phase difference after the detecting the amplitude difference or the phase difference,
   wherein a component synchronous with a sine or cosine wave with a period of ½ the period of the "SIN" or "COS" signal is extracted from a radius variation waveform of a Lissajous waveform formed by the "SIN" and "COS" signals to obtain the amplitude difference or the phase difference between the "SIN" signal and the "COS" signal,
   wherein for extracting the component synchronous with the sine or cosine wave with a period of ½ the period of the "SIN" or "COS" signal from the radius variation waveform of the Lissajous waveform, results of multiplying the radius variation waveform of the Lissajous waveform by sin(4πn/N) or cos(4πn/N) are averaged over a most recent one period of the Lissajous waveform,
   where N is an even natural number, and n is an integer from 0 to N−1 proportional to a phase of the Lissajous waveform in one period.

6. The automatic correction method according to claim 5, wherein each of sin(4πn/N) and cos(4πn/N) is quantized and expressed in two values of ±1 or three values of 0 and ±1.

7. An automatic correction method for an encoder system for reading periodic signals on a scale as "SIN" and "COS" signals and converting the periodic signals into position signals, the automatic correction method comprising:
   detecting a second order distortion of the "SIN" or "COS" signal, and feeding back the second order distortion to the "SIN" or "COS" signal to make the second order distortion smaller so as to reduce an interpolation error after the conversion; and
   correcting the encoder using the second order distortion after the detecting the second order distortion,
   wherein a component synchronous with a sine or cosine wave with a period of ⅓ the period of the "SIN" or "COS" signal is extracted from a radius variation waveform of a Lissajous waveform formed by the "SIN" and "COS" signals to obtain the second order distortion of the "SIN" signal or the "COS" signal.

8. The automatic correction method according to claim 7, wherein for extracting the component synchronous with the sine or cosine wave with a period of ⅓ the period of the "SIN" or "COS" signal from the radius variation waveform of the Lissajous waveform, results of multiplying the radius variation waveform of the Lissajous waveform by sin(6πn/N) or cos(6πn/N) are averaged over a most recent one period of the Lissajous waveform,
   where N is an even natural number, and n is an integer from 0 to N−1 proportional to a phase of the Lissajous waveform in one period.

9. The automatic correction method according to claim 8, wherein each of sin(6πn/N) and cos(6πn/N) is quantized and expressed in two values of ±1 or three values of 0 and ±1.

10. An automatic correction method for an encoder system for reading periodic signals on a scale as "SIN" and "COS" signals and converting the periodic signals into position signals, the automatic correction method comprising:
    detecting a third order distortion of the "SIN" or "COS" signal, and feeding back the third order distortion to the "SIN" or "COS" signal to make the third order distortion smaller so as to reduce an interpolation error after the conversion; and
    correcting the encoder using the third order distortion after the detecting the third order distortion,
    wherein a component synchronous with a sine or cosine wave with a period of ¼ the period of the "SIN" or "COS" signal is extracted from a radius variation waveform of a Lissajous waveform formed by the "SIN" and "COS" signals to obtain the third order distortion of the "SIN" signal or the "COS" signal,
    wherein for extracting the component synchronous with the sine or cosine wave with a period of ¼ the period of the "SIN" or "COS" signal from the radius variation waveform of the Lissajous waveform, results of multiplying the radius variation waveform of the Lissajous waveform by sin(8πn/N) or cos(8πn/N) are averaged over a most recent one period of the Lissajous waveform,
    where N is an even natural number, and n is an integer from 0 to N−1 proportional to a phase of the Lissajous waveform in one period.

11. The automatic correction method according to claim 10,
    wherein each of sin(8πn/N) and cos(8πn/N) is quantized and expressed in two values of ±1 or three values of 0 and ±1.

12. An automatic correction method for an encoder system for reading periodic signals on a scale as "SIN" and "COS" signals and converting the periodic signals into position signals, the automatic correction method comprising:
    detecting an offset of the "SIN" or "COS" signal, and feeding back the offset to the "SIN" or "COS" signal to make the offset smaller so as to reduce an interpolation error after the conversion; and
    correcting the encoder using the offset after detecting the offset,
    wherein a component synchronous with a sine or cosine wave is extracted from a square of radius variation waveform of a Lissajous waveform formed by the "SIN" and "COS" signals to obtain the offset of the "SIN" signal or the "COS" signal.

* * * * *